(12) United States Patent
Lee et al.

(10) Patent No.: US 9,705,644 B2
(45) Date of Patent: Jul. 11, 2017

(54) METHOD FOR OPERATING BUFFER FOR DEVICE-TO-DEVICE (D2D) COMMUNICATION IN WIRELESS COMMUNICATION SYSTEM, AND APPARATUS FOR SAME

(71) Applicant: LG ELECTRONICS INC., Seoul (KR)

(72) Inventors: Seungmin Lee, Anyang-si (KR); Hanbyul Seo, Anyang-si (KR); Hakseong Kim, Anyang-si (KR); Inkwon Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 53 days.

(21) Appl. No.: 14/409,336

(22) PCT Filed: Jul. 5, 2013

(86) PCT No.: PCT/KR2013/006002
§ 371 (c)(1),
(2) Date: Dec. 18, 2014

(87) PCT Pub. No.: WO2014/007580
PCT Pub. Date: Jan. 9, 2014

(65) Prior Publication Data
US 2015/0180616 A1 Jun. 25, 2015

Related U.S. Application Data

(60) Provisional application No. 61/668,436, filed on Jul. 5, 2012.

(51) Int. Cl.
*H04B 7/00* (2006.01)
*H04L 1/18* (2006.01)
(Continued)

(52) U.S. Cl.
CPC .......... *H04L 1/1861* (2013.01); *H04L 1/1812* (2013.01); *H04L 1/1835* (2013.01);
(Continued)

(58) Field of Classification Search
CPC ... H04W 74/02; H04W 76/02; H04W 76/023; H04W 88/04
(Continued)

(56) References Cited

U.S. PATENT DOCUMENTS 8,205,127 B2 * 6/2012 Wan ............... H04L 1/1809
714/748
8,537,037 B2 * 9/2013 Majonen ............ H04L 1/1845
341/51

(Continued)

FOREIGN PATENT DOCUMENTS

KR 10-2011-0127080 A 11/2011

OTHER PUBLICATIONS

Raghothaman et al., "System Architecture for a Cellular Network with Cooperative Mobile Relay," In: IEEE Vehicular Technology Conference (VTC Fall), Sep. 5-8, 2011, 5 pages.

*Primary Examiner* — Dmitry H Levitan
(74) *Attorney, Agent, or Firm* — Birch, Stewart, Kolasch & Birch, LLP

(57) ABSTRACT

A method for a terminal transmitting/receiving a signal with device-to-device (D2D) on the basis of a hybrid automatic repeat and request (HARQ) in a wireless communication system, comprises the steps of: receiving allocation information for establishing a wireless resource for a specific HARQ process from at least one first HARQ process as a wireless resource for a second HARQ process; and transmitting/receiving the signal with an external terminal by using the wireless resource of the second HARQ process, wherein a soft buffer, which is linked to the second HARQ process, is a reestablished soft buffer that is linked to the at least one HARQ process, in accordance with the allocation information.

9 Claims, 15 Drawing Sheets

(51) Int. Cl.
*H04W 72/04* (2009.01)
*H04L 5/00* (2006.01)
(52) U.S. Cl.
CPC ....... *H04W 72/042* (2013.01); *H04W 72/048* (2013.01); *H04L 5/0055* (2013.01)
(58) Field of Classification Search
USPC .................. 370/310, 328, 329, 464, 465
See application file for complete search history.

(56) References Cited

U.S. PATENT DOCUMENTS

| | | | |
|---|---|---|---|
| 8,548,483 B2 * | 10/2013 | Phan | H04W 72/048 455/450 |
| 8,724,742 B2 * | 5/2014 | Nimbalker | H04L 1/1822 375/260 |
| 8,751,890 B2 * | 6/2014 | Mueller-Weinfurtner | H04L 1/1812 714/748 |
| 8,761,099 B2 * | 6/2014 | Charbit | H04W 72/04 370/329 |
| 8,797,957 B2 * | 8/2014 | Cheng | H04L 1/1835 370/252 |
| 8,885,525 B2 * | 11/2014 | Hsieh | H04L 1/1845 370/280 |
| 9,014,062 B2 * | 4/2015 | Ahn | H04L 1/0003 370/280 |
| 9,172,520 B1 * | 10/2015 | Cheng | H04L 1/1835 |
| 2010/0050034 A1 * | 2/2010 | Che | H04L 1/1845 714/748 |
| 2012/0083283 A1 | 4/2012 | Phan et al. | |
| 2012/0106517 A1 | 5/2012 | Charbit et al. | |
| 2012/0163252 A1 | 6/2012 | Ahn et al. | |
| 2013/0064146 A1 | 3/2013 | Ahn et al. | |

\* cited by examiner

FIG. 1 --Prior Art--
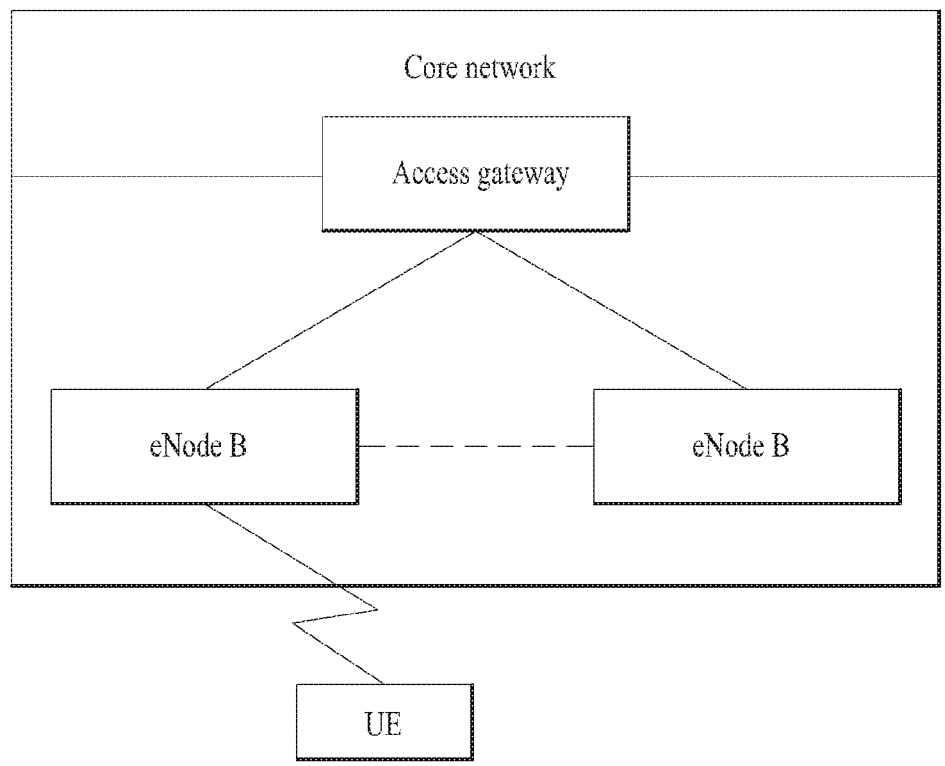

FIG. 2 --Prior Art--
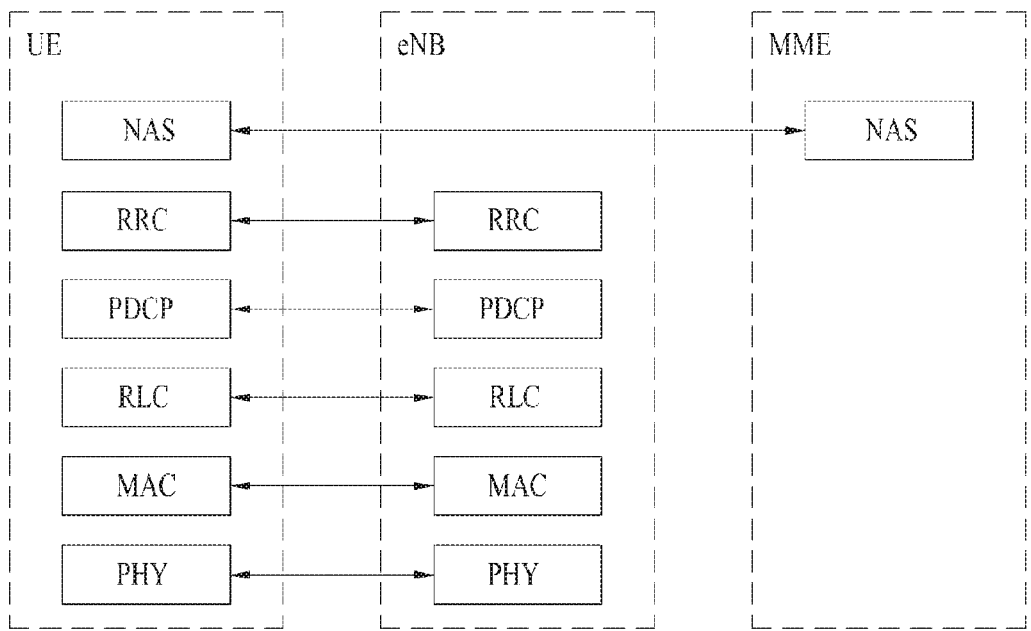
(a) Control-plane protocol stack
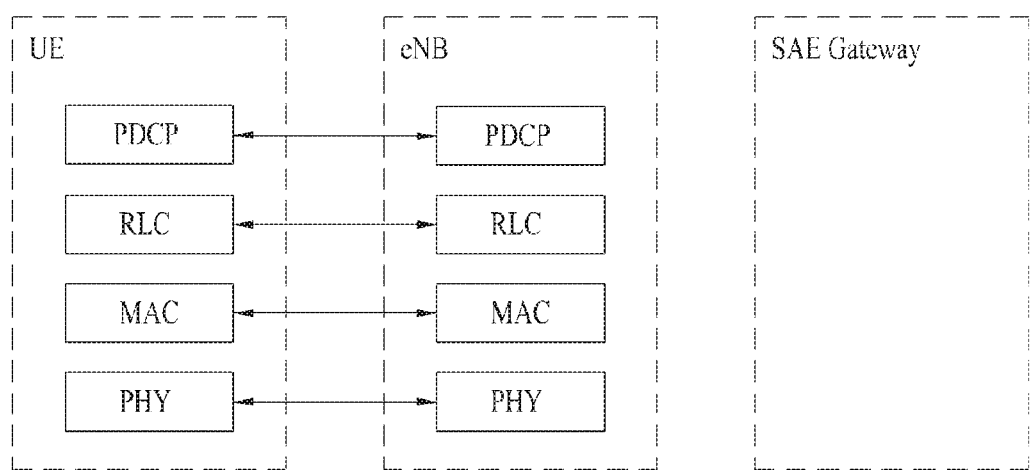
(b) User-plane protocol stack

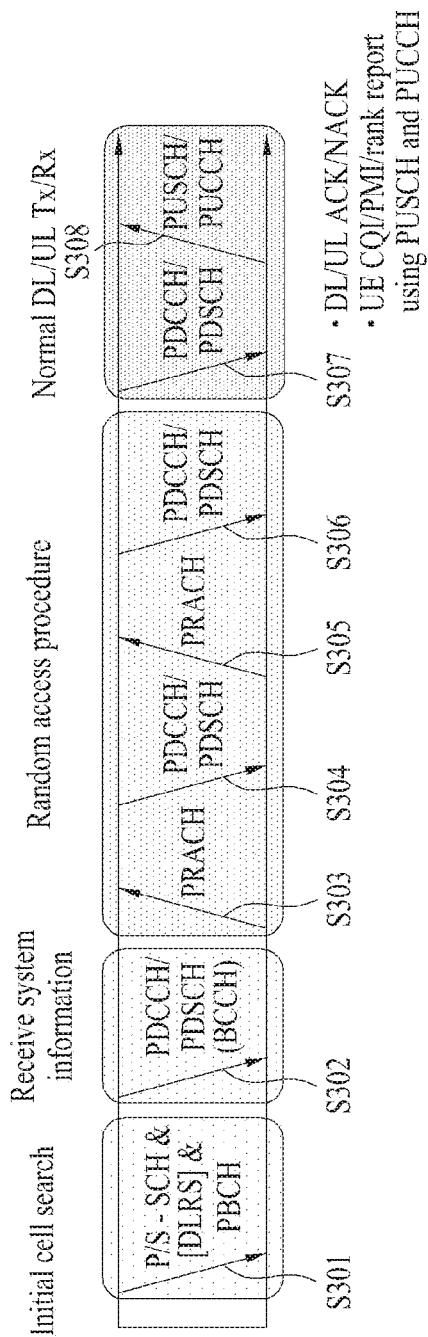
FIG. 3 —Prior Art—

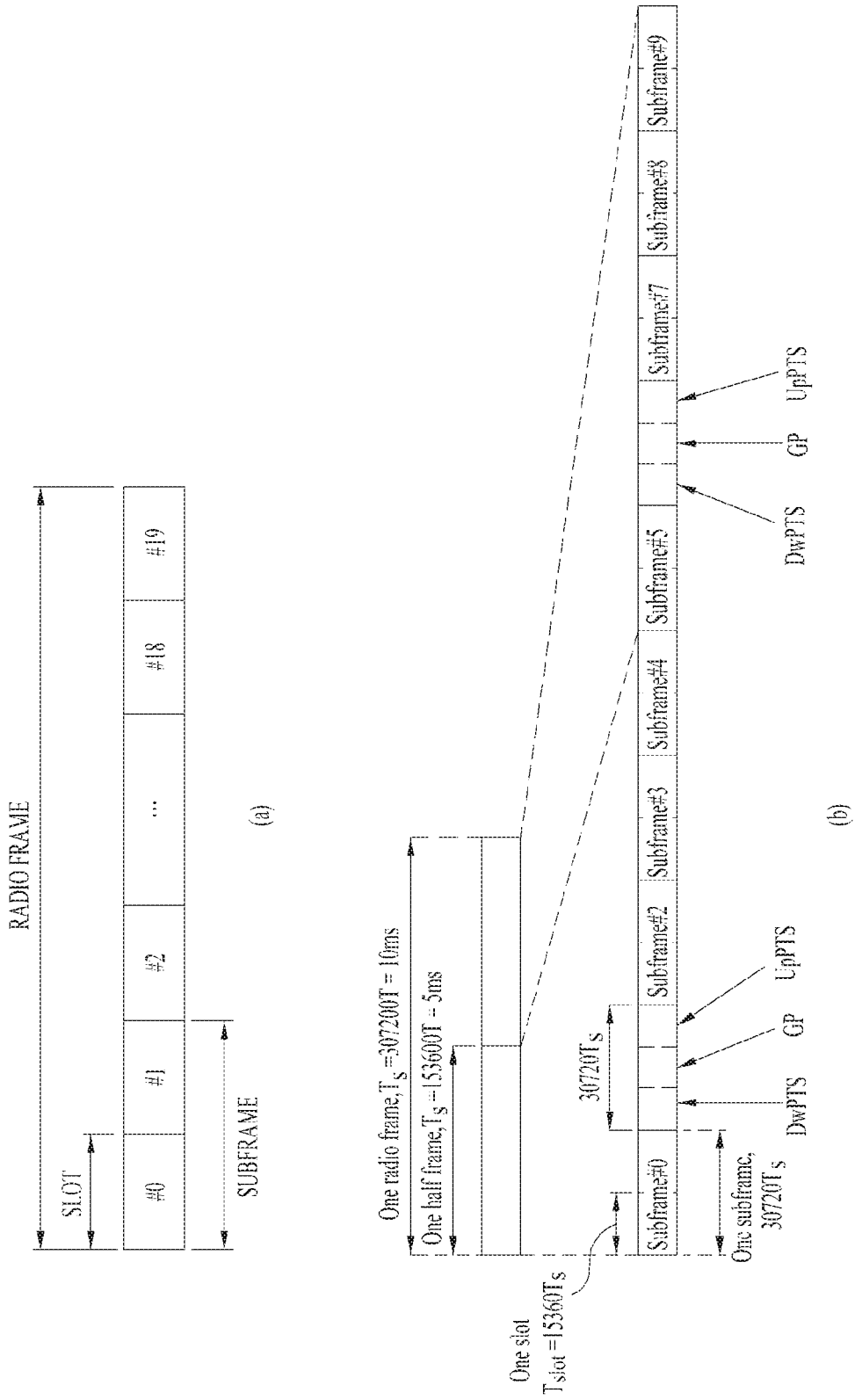

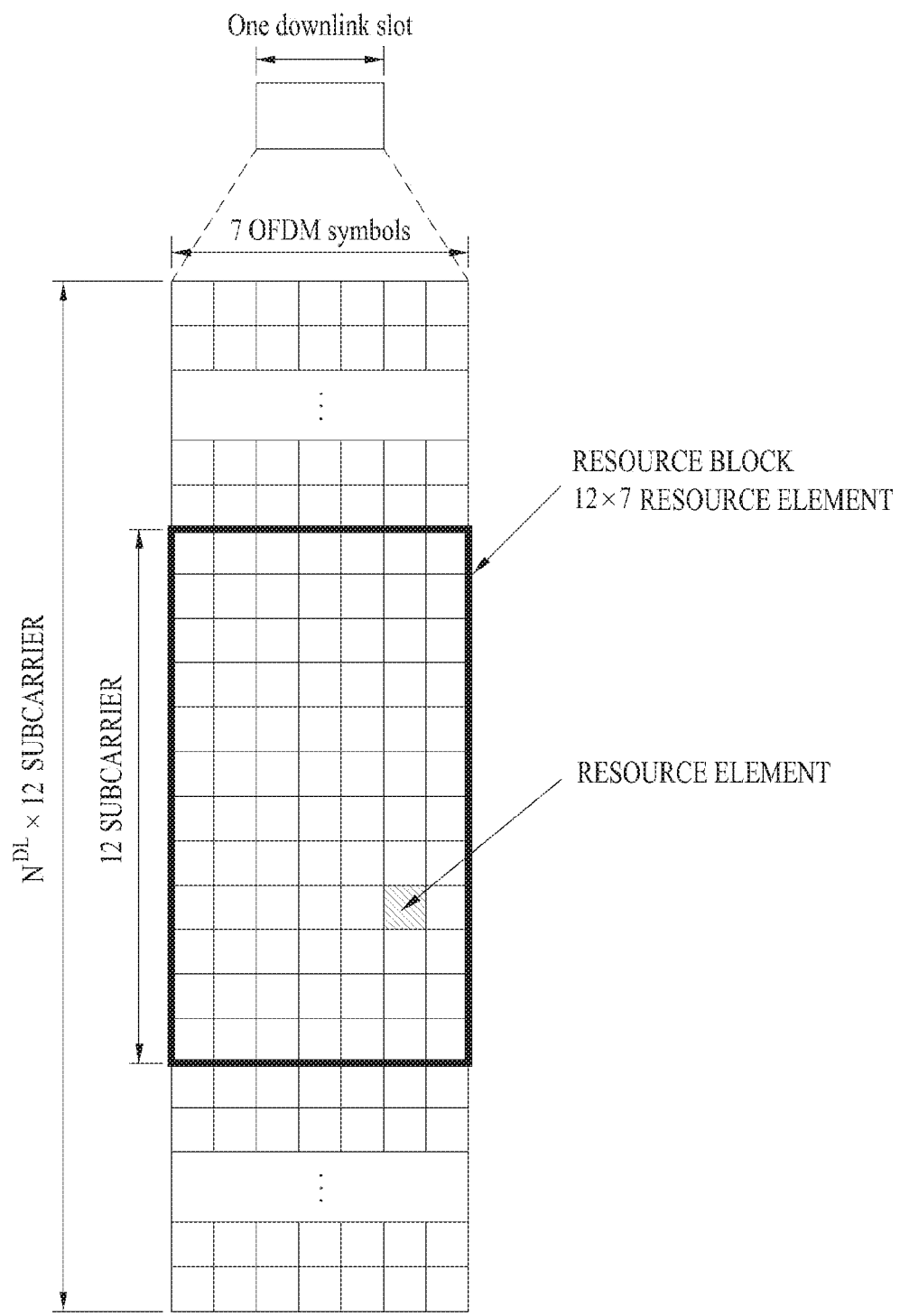
FIG. 5 --Prior Art--

FIG. 6 --Prior Art--
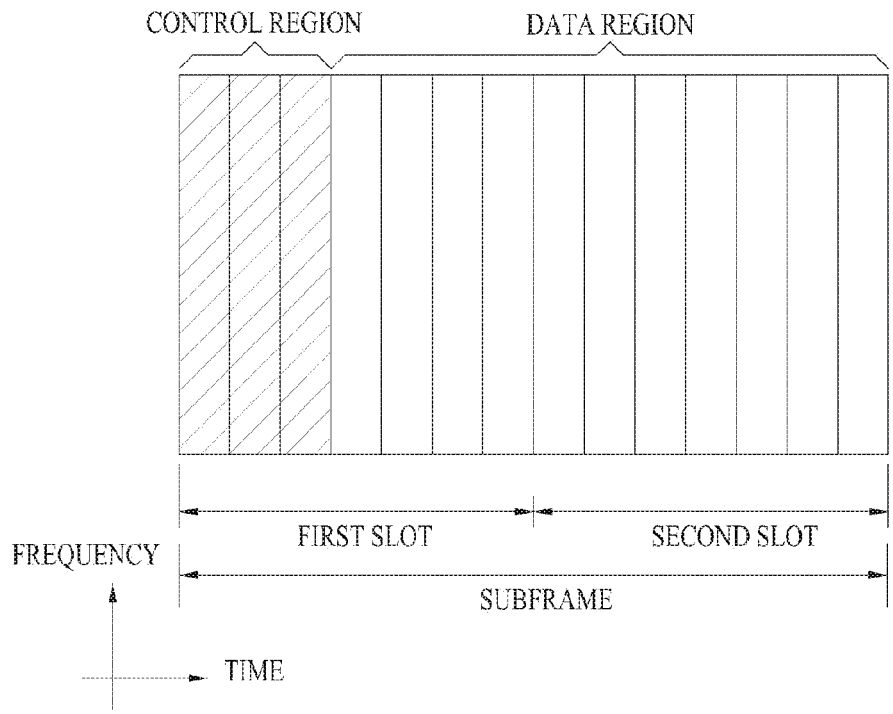
FIG. 7 --Prior Art--
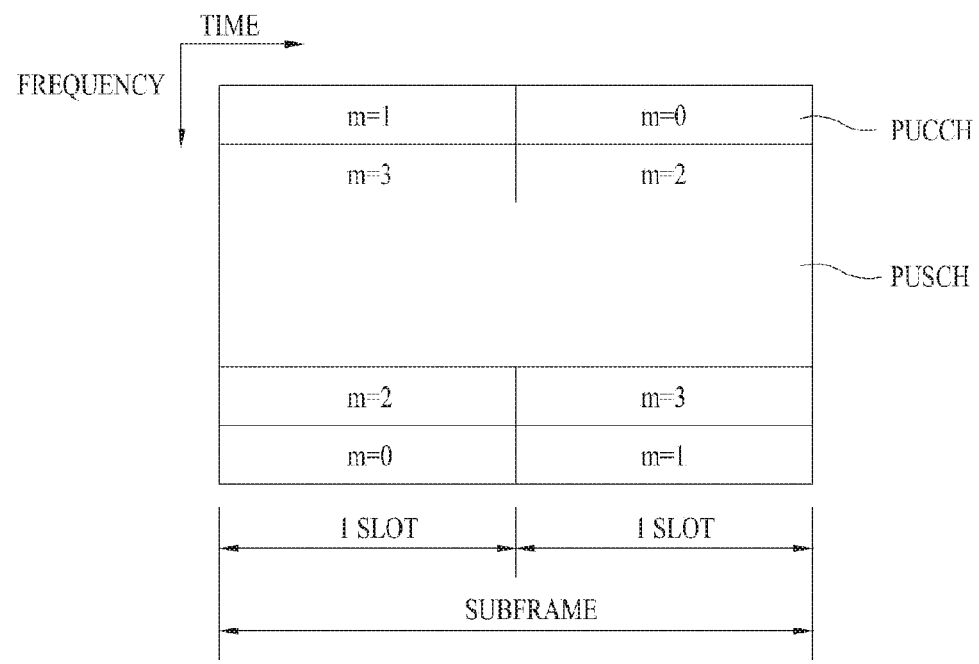

FIG. 10
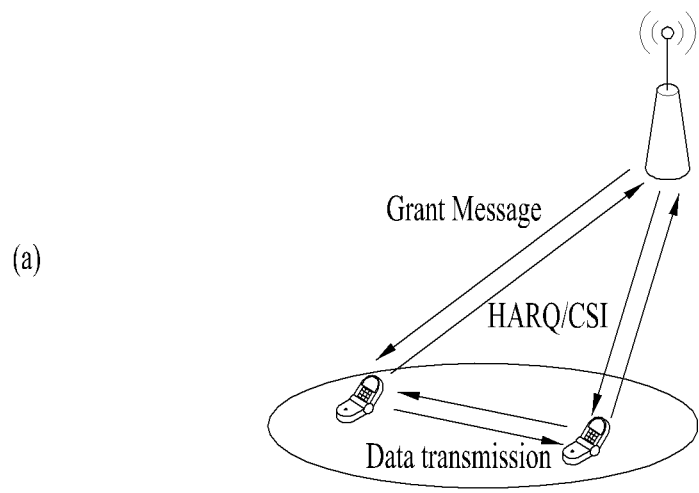
(a)
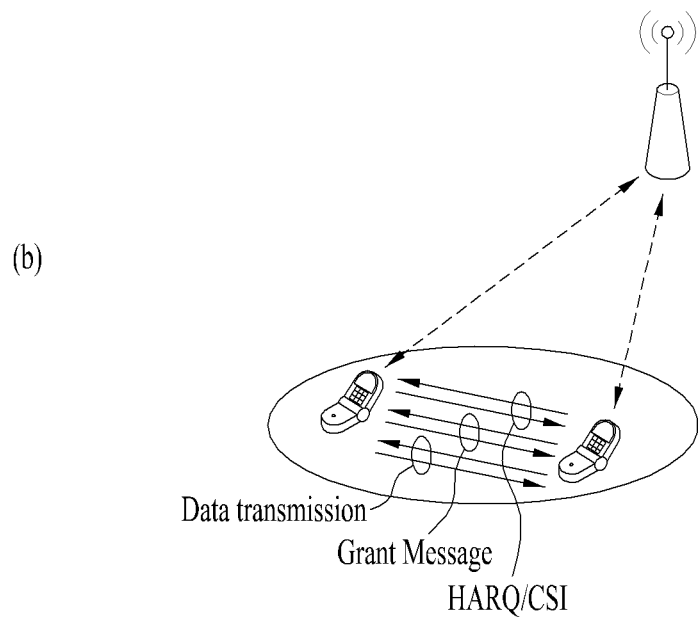
(b)

METHOD FOR OPERATING BUFFER FOR DEVICE-TO-DEVICE (D2D) COMMUNICATION IN WIRELESS COMMUNICATION SYSTEM, AND APPARATUS FOR SAME

CROSS REFERENCE TO RELATED APPLICATIONS

This application is the National Phase of PCT International Application No. PCT/KR2013/006002, filed on Jul. 5, 2013, which claims priority under 35 U.S.C. 119(e) to U.S. Provisional Application No. 61/668,436, filed on Jul. 5, 2012, all of which are hereby expressly incorporated by reference into the present application.

TECHNICAL FIELD

The present invention relates to a wireless communication system and, more specifically, to a method for operating a buffer for D2D communication in a wireless communication system and an apparatus for the same.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

A UE reports current channel status information to a base station periodically and/or aperiodically in order to assist in efficient operation of a wireless communication system. Since the reported channel status information may include results calculated in consideration of various situations, a more efficient reporting method is needed.

DISCLOSURE

Technical Problem

An object of the present invention devised to solve the problem lies in a method for operating a buffer for D2D communication in a wireless communication and an apparatus for the same.

The technical problems solved by the present invention are not limited to the above technical problems and those skilled in the art may understand other technical problems from the following description.

Technical Solution

In an aspect of the present invention, a method for transmitting and receiving a D2D (device-to-device) signal on the basis of a hybrid automatic repeat and request (HARQ) of a terminal in a wireless communication system, includes: receiving allocation information for setting a radio resource for a specific HARQ process from among at least one first HARQ process as a radio resource for a second HARQ process; and transmitting/receiving a signal to/from an external terminal by using the radio resource of the second HARQ process, wherein a soft buffer linked to the second HARQ process is a reestablished soft buffer linked to the at least one HARQ process according to the allocation information.

The allocation information may include an ID of the specific HARQ process, and a size of the soft buffer linked to the second HARQ process may be set to be identical to a size of a soft buffer linked to the specific HARQ process.

The at least one first HARQ process and the second HARQ process may be independently set, and the allocation information may include information on the number of second HARQ processes. The size of the soft buffer linked to the second HARQ process may be set on the basis of the sum of the number of the at least one first HARQ process and the number of second HARQ processes.

The size of the soft buffer linked to the second HARQ process may be set to be larger than the size of the soft buffer linked to the first HARQ process.

The allocation information may include information on the size of the soft buffer linked to the second HARQ process, and the size of the soft buffer linked to the second HARQ process may be determined by the ratio of a system bandwidth for the first HARQ process to a system bandwidth for the second HARQ process.

The soft buffer may be linked to one of the first HARQ process and the second HARQ process according to a communication load state at a specific time. The soft buffer may be linked to the first HARQ process when an eNB2D communication load is higher than a D2D communication load and linked to the second HARQ process when the D2D communication load is higher than the eNB2D communication load.

The method may further include transmitting information for transport block size (TBS) readjustment to an eNB when the size of the soft buffer linked to the first HARQ process differs from the size of the soft buffer linked to the second HARQ process.

The wireless communication system may support carrier aggregation (CA), the allocation information may include information on a component carrier for the at least one first HARQ process and a component carrier for the second HARQ process, and the soft buffer may be reestablished on the basis of the component carriers for the at least one first HARQ process and the second HARQ process.

The at least one first HARQ process may be a HARQ process established for eNodeB-to-device (eNB2D) communication, and the second HARQ process may be a HARQ process established for device-to-device (D2D) communication.

In another aspect of the present invention, provided herein is a terminal for transmitting and receiving a D2D (device-to-device) signal on the basis of a HARQ in a wireless communication system, including: a radio frequency (RF) unit; and a processor, wherein the processor is configured to receive allocation information for setting a radio resource for a specific HARQ process from among at least one first HARQ process as a radio resource for a second HARQ process and to transmit/receive a signal to/from an external terminal by using the radio resource of the second HARQ process, wherein a soft buffer linked to the second HARQ process is a reestablished soft buffer linked to the at least one HARQ process according to the allocation information.

Advantageous Effects

According to embodiments of the present invention, it is possible to efficiently operate a HARQ buffer while supporting D2D communication in a wireless communication system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 1 illustrates an E-UMTS network architecture as an exemplary mobile communication system;

FIG. 2 illustrates a control plane and a user plane of a radio interface protocol between a UE and E-UTRAN based on 3GPP radio access network standards;

FIG. 3 illustrates physical channels used for 3GPP LTE and a general signal transmission method using the physical channels;

FIG. 4 illustrates a radio frame structure used in LTE;

FIG. 5 illustrates a resource grid of a downlink slot;

FIG. 6 illustrates a downlink subframe structure;

FIG. 7 illustrates an uplink subframe structure used in LTE;

FIG. 10 illustrates D2D (UE-to-UE) communication;

BEST MODE

Figure 8:
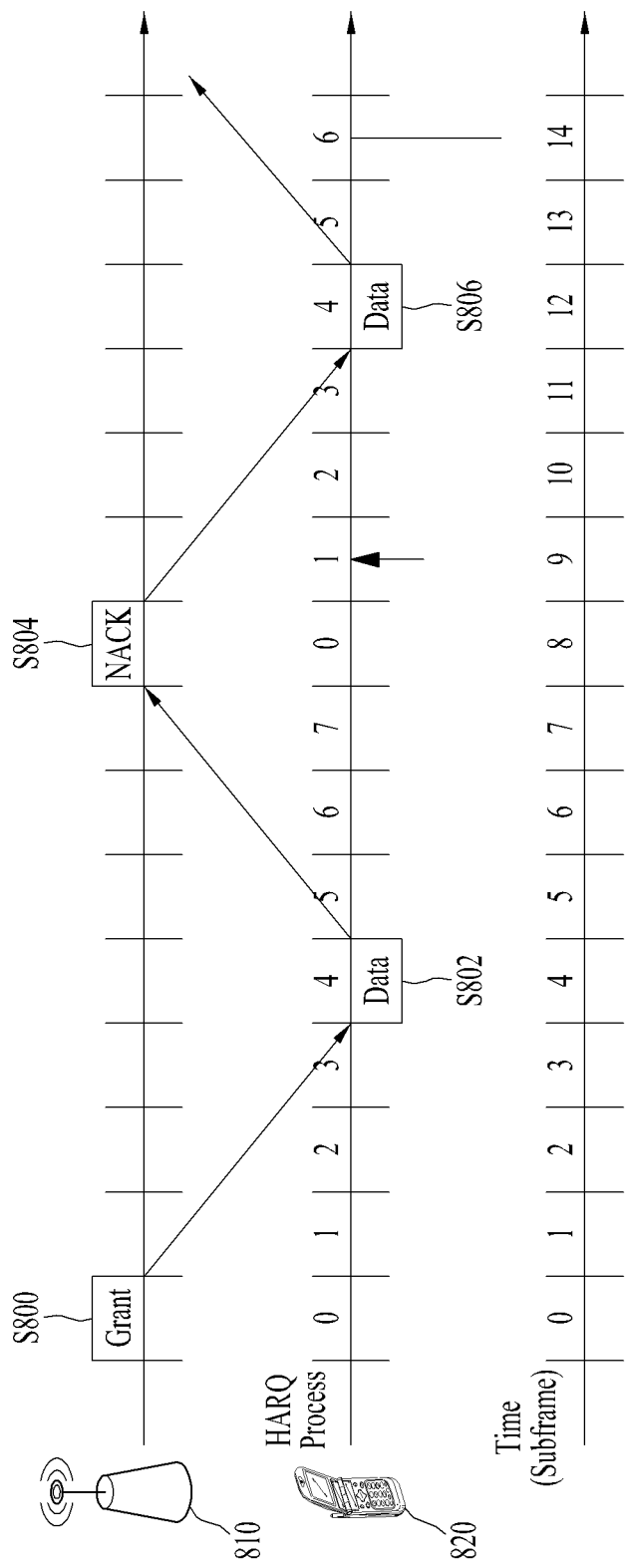
FIG. 8 illustrates a UL HARQ operation in LTE.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

FIG. 5 is a diagram illustrating a resource grid of a downlink slot.

Referring to FIG. 5, the downlink slot includes a plurality of $N_{symb}^{DL}$ OFDM symbols in a time domain and a plurality of $N_{RB}^{DL}$ resource blocks in a frequency domain. Since each resource block includes $N_{sc}^{RB}$ subcarriers, the downlink slot includes $N_{RB}^{DL} \times N_{sc}^{RB}$ subcarriers in the frequency domain. Although FIG. 5 illustrates that the downlink slot includes seven OFDM symbols and the resource block includes twelve subcarriers, it is to be understood that the downlink slot and the resource block are not limited to the example of FIG. 5. For example, the number of OFDM symbols included in the downlink slot may be varied depending on the length of the CP.

Each element on the resource grid will be referred to as a resource element (RE). One resource element is indicated by one OFDM symbol index and one subcarrier index. One RB includes $N_{symb}^{DL} \times N_{sc}^{RB}$ number of resource elements. The number $N_{RB}^{DL}$ of resource blocks included in the downlink slot depends on a downlink transmission bandwidth configured in the cell.

FIG. 6 is a diagram illustrating a structure of a downlink subframe.

Referring to FIG. 6, maximum three (four) OFDM symbols located at the front of the first slot of the subframe correspond to a control region to which a control channel is allocated. The other OFDM symbols correspond to a data region to which a physical downlink shared channel (PDSCH) is allocated. Examples of downlink control channels used in the LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK (Hybrid Automatic Repeat reQuest acknowledgement/negative-acknowledgement) signals in response to uplink transmission.

The control information transmitted through the PDCCH will be referred to as downlink control information (DCI). The DCI includes resource allocation information for a user equipment or user equipment group. For example, the DCI includes uplink/downlink scheduling information, uplink transmission (Tx) power control command, etc.

The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the number of CCEs. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

FIG. 7 illustrates an uplink subframe structure used in LTE.

Referring to FIG. 7, an uplink subframe includes a plurality of (e.g. 2) slots. A slot may include different numbers of SC-FDMA symbols according to CP lengths. The uplink subframe is divided into a control region and a data region in the frequency domain. The data region is allocated a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.

Scheduling Request (SR): This is information used to request a UL-SCH resource and is transmitted using On-Off Keying (OOK).

HARQ-ACK/NACK: This is a response to a downlink data packet on a PDSCH and indicates whether the downlink data packet has been successfully received. A 1-bit HARQ-ACK signal is transmitted as a response to a single downlink codeword and a 2-bit HARQ-ACK signal is transmitted as a response to two downlink codewords.

Channel State Information (CSI): This is feedback information about a downlink channel. The CSI includes a channel quality indicator (CQI) and MIMO (Multiple Input Multiple Output)-related feedback information includes a rank indicator (RI), a precoding matrix indicator (PMI), a precoding type indicator (PTI) and the like. 20 bits are used per subframe.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH.

A description will be given of HARQ (Hybrid Automatic Repeat and reQuest) in a wireless communication system.

When a plurality of UEs having data to be transmitted on uplink/downlink is present in a wireless communication system, an eNB selects UEs which will transmit data in each transmission time interval (TTI) (e.g. subframe). In a system using multiple carriers or the like, particularly, an eNB selects UEs which will transmit data on uplink/downlink in each TTI and also selects a frequency band used for each selected UE to transmit data.

In an uplink operation, UEs transmit reference signals (or pilot signals) on uplink and the eNB checks channel states of the UEs using the reference signals transmitted from the UEs and selects UEs that will transmit data on uplink in respective unit frequency bands in each TTI. The eNB signals the result of selection to the UEs. Specifically, the eNB transmits, to a UE that is uplink-scheduled in a specific TTI, an uplink assignment message indicating that the UE is permitted to send data using a specific frequency band. The uplink assignment message is also referred to as a UL grant. The UE transmits data on uplink according to the uplink assignment message. The uplink assignment message fundamentally includes a UE ID, RB allocation information, a payload and the like and may additionally include an incremental redundancy (IR) version, a new data indicator (NDI) and the like.

When a synchronous non-adaptive HARQ scheme is applied, and a UE scheduled in a specific TTI performs retransmission, a retransmission time is appointed systematically (e.g. after 4 subframes from a NACK reception time). Accordingly, the eNB sends a UL grant message to a UE in initial transmission only and retransmission is performed according to an ACK/NACK signal. When an asynchronous adaptive HARQ scheme is applied, a retransmission time is not appointed between the eNB and the UE and thus the eNB needs to send a retransmission request message to the UE. In addition, since a frequency resource or MCS for retransmission varies with transmission time, the eNB needs to transmit a HARQ process index, IR version and NDI information with a UE ID, RB allocation information and a payload when sending the retransmission request message.

FIG. 8 illustrates a UL HARQ operation in LTE. In LTE, the UL HARQ scheme uses synchronous non-adaptive HARQ. When 8-channel HARQ is used, HARQ process numbers of 0 to 7 are provided. One HARQ process operates per TTI (e.g. subframe). Referring to FIG. 8, an eNB 810 transmits a UL grant to a UE 820 through a PDCCH (S800). The UE 820 transmits uplink data to the eNB 810 using an RB and an MCS, which are designated by the UL grant, after 4 subframes (e.g. subframe 4) from when the UL grant is received (e.g. subframe 0) (S802). The eNB decodes the uplink data received from the UE 820 and then generates ACK/NACK. When the eNB 810 fails to decode the uplink data, the eNB 810 transmits NACK to the UE 820 (S804). The UE 820 retransmits the uplink data after 4 subframes from when the NACK is received (S806). Here, initial transmission and retransmission of the uplink data are performed through the same HARQ process (e.g. HARQ process 4).

A description will be given of a DL/UL HARQ operation in an FDD system.

Figure 9:
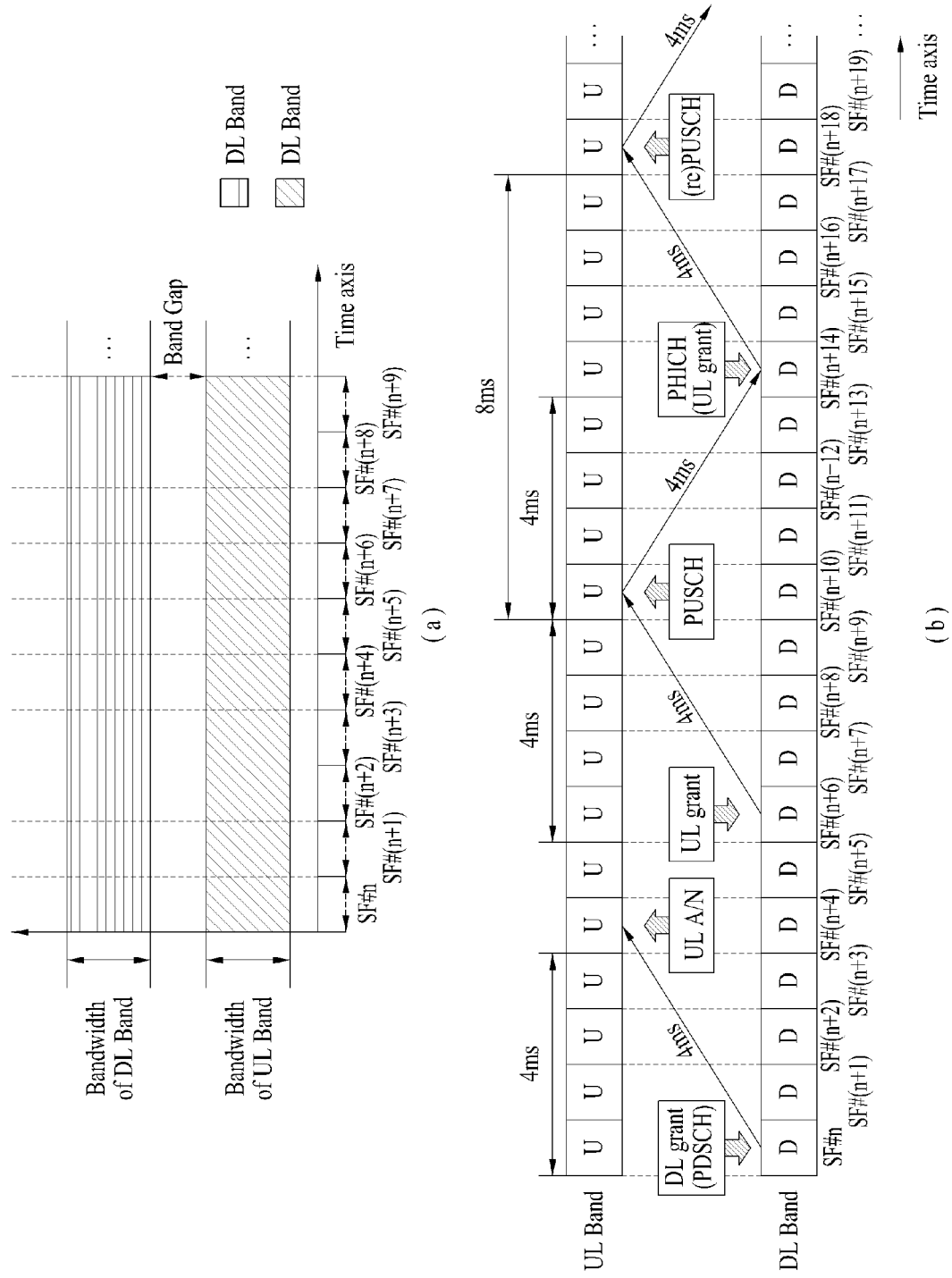
FIG. 9 illustrates an FDD system and a DL/UL HARQ timeline.

FIG. 9 illustrates an FDD system and a DL/UL HARQ timeline. In the FDD system as illustrated in FIG. 9(a), downlink/uplink data corresponding to specific uplink/downlink data is received after 4 ms. Referring to FIG. 9(b), for example, transmission of UL ACK/NACK for a PDSCH is started after 4 ms from when the PDSCH/downlink grant (DL grant) is received. A PUSCH corresponding to a UL grant/PHICH is transmitted after 4 ms from when the UL grant/PHICH is received, and a PHICH/UL grant corresponding to PUSCH transmission/retransmission are received after 4 ms from the PUSCH transmission/retransmission time.

In 3GPP LTE, synchronous HARQ is used for UL HARQ operation and asynchronous HARQ is used for DL HARQ operation. Synchronous HARQ is a scheme in which retransmission is performed at a time determined by the system when initial transmission fails. That is, a time with respect to uplink data transmission/retransmission related to a specific HARQ process or a UL grant/PHICH timeline is predefined and cannot be arbitrarily changed. In asynchronous HARQ, retransmission of data that has not been transmitted through initial transmission can be performed at an arbitrary time after 8 ms, including initial transmission time.

In FIGS. 8 and 9, each HARQ process is defined by a 3-bit HARQ process identifier and a receiving end (i.e. a UE in a downlink HARQ process and an eNB in an uplink HARQ process) requires independent soft buffer allocation for combination of retransmitted data.

A description will be given of D2D (UE-to-UE) communication.

D2D communication can be classified into a scheme assisted by a network/coordination station (e.g. eNB) and a scheme that is not assisted by the network/coordination station.

Referring to FIG. 10(a), the network/coordination station intervenes in transmission and reception of a control signal (e.g. grant message), HARQ, CSI and the like, and only data is transmitted and received between UEs performing D2D communication. Referring to FIG. 10(b), the network provides only minimum information (e.g. D2D connection information that can be used in a corresponding cell) and UEs performing D2D communication establish a link and transmit/receive data.

A description will be given of methods for operating a buffer for supporting communication between UEs (or communication between an eNB and a UE) in an environment in which both communication between UEs (i.e. UE-to-UE (D2D) communication) and communication between an eNB and a UE (i.e. eNB-to-UE (eNB2D) communication) are performed, according to the present invention.

The methods provided by the present invention are described on the basis of 3GPP LTE for convenience of description. However, the range of systems to which the methods are applied can be extended to systems other than 3GPP LTE.

The methods provided by the present invention can be extended and applied to any case in which D2D communication is performed on the basis of a predetermined time/frequency resource region in an FDD or TDD system. For example, D2D communication can be performed on the basis of a predetermined time/frequency resource region by reusing part of existing radio resources or newly setting (or allocating) radio resources for D2D communication in the FDD or TDD system.

Accordingly, the methods provided by the present invention can be extended and applied to a case in which D2D communication is performed through various predetermined radio resource regions as well as a case in which D2D communication is performed on the basis of existing uplink radio resources.

The methods provided by the present invention, which will be described below, may be extended and applied to a case in which UEs participating in D2D communication communicate with the same eNB or a case in which the UEs respectively communicate with different eNBs.

Figure 11:
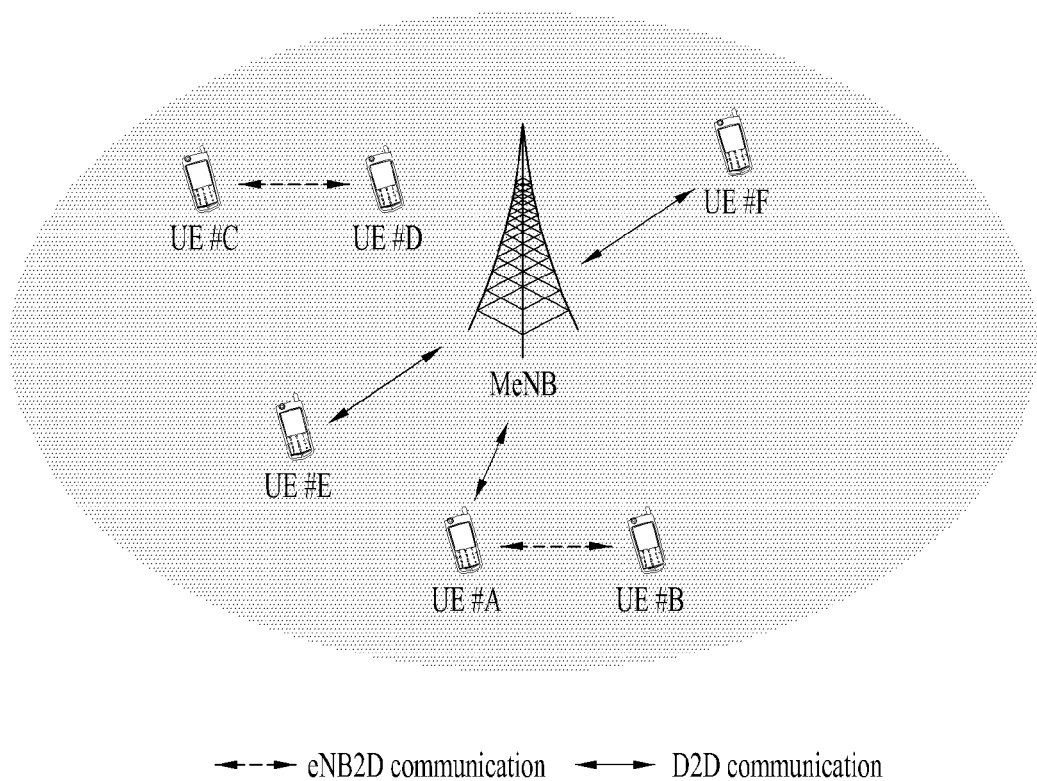
FIGS. 11 and 12 illustrate reuse of part of existing uplink radio resources for D2D communication between UEs when both D2D communication and eNB2D communication are performed on a network.
Figure 12:
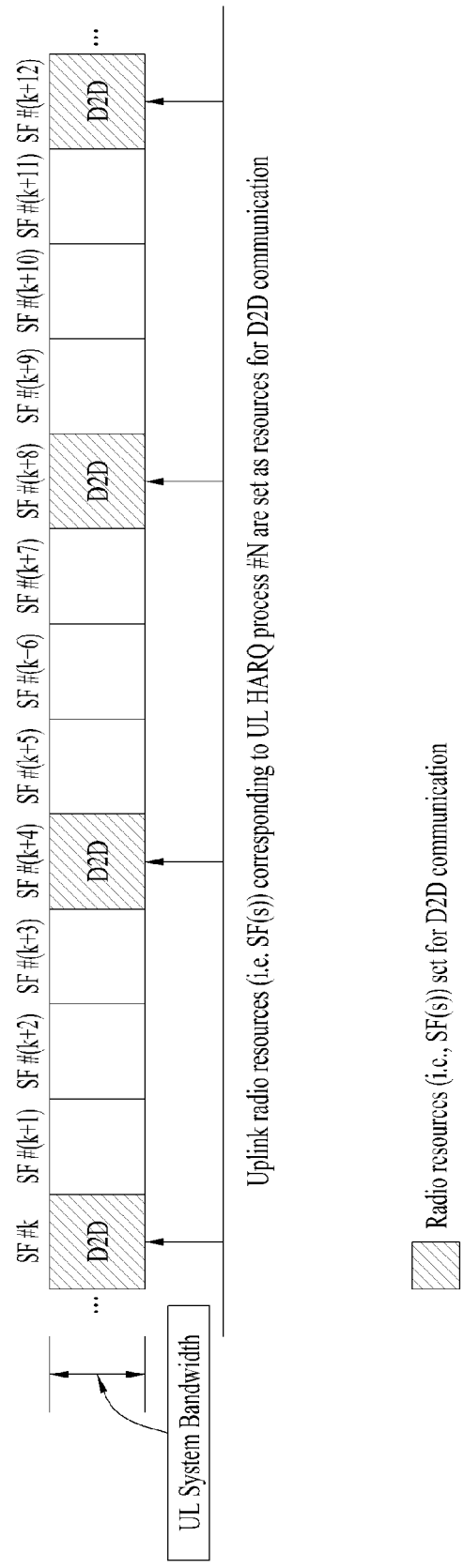

FIGS. 11 and 12 illustrate a case in which part of existing uplink radio resources is reused for D2D communication between UEs when both D2D communication and eNB2D communication are performed on a network.

Referring to FIG. 11, D2D communication is performed between UE#A and UE#B or between UE#C and UE#D and eNB2D communication is performed between a macro eNodeB (MeNB) and UE#E, between the MeNB and UE#F and between the MeNB and UE#A.

In the situation as shown in FIG. 11, uplink radio resources (i.e. subframes) corresponding to uplink HARQ process #N (UL HARQ process #N) may be set or allocated as resources for D2D communication, as illustrated in FIG. 12, for D2D communication between UEs.

In FIG. 12, an FDD system is assumed, and uplink radio resources corresponding to a specific UL HARQ process are set to be reused for D2D communication in order to minimize the influence of D2D communication on D2eNB uplink communication. Furthermore, it can be assumed that UEs participating in D2D communication transmit ACK/NACK according to whether the UEs have successfully received D2D data and retransmit D2D data on the basis of a conventional uplink HARQ process timeline (or downlink HARQ process timeline) in FIG. 12.

Accordingly, the present invention provides a method for efficiently operating (or managing) a soft buffer of a specific UE so as to enable the specific UE to simultaneously perform eNB2D communication and D2D communication.

It is assumed that a soft buffer size of a UE per downlink/uplink HARQ process is determined by dividing "a total downlink/uplink soft buffer size" of the UE by "a maximum number of HARQ processes used for downlink/uplink communication" for convenience of description. However, the provided method can be extended and applied even to a case in which the soft buffer size of the UE per downlink/uplink HARQ process is determined in a manner other than the aforementioned assumption.

First Embodiment

According to the first embodiment of the present invention, an eNB may set part of a plurality of downlink HARQ processes set for eNB2D downlink communication, for D2D communication of a UE.

For example, when the UE receives information about downlink HARQ processes set for D2D communication from the eNB using a predetermined higher layer signal or physical layer signal or through a predefined rule, the UE can use a soft buffer region related to the corresponding downlink HARQ processes for D2D communication or a HARQ operation of D2D communication.

In addition, according to the first embodiment of the present invention, the information about the eNB2D downlink HARQ processes set for D2D communication, transmitted from the eNB to the UE, may be signaled in the form of IDs of the corresponding downlink HARQ processes.

Figure 13:
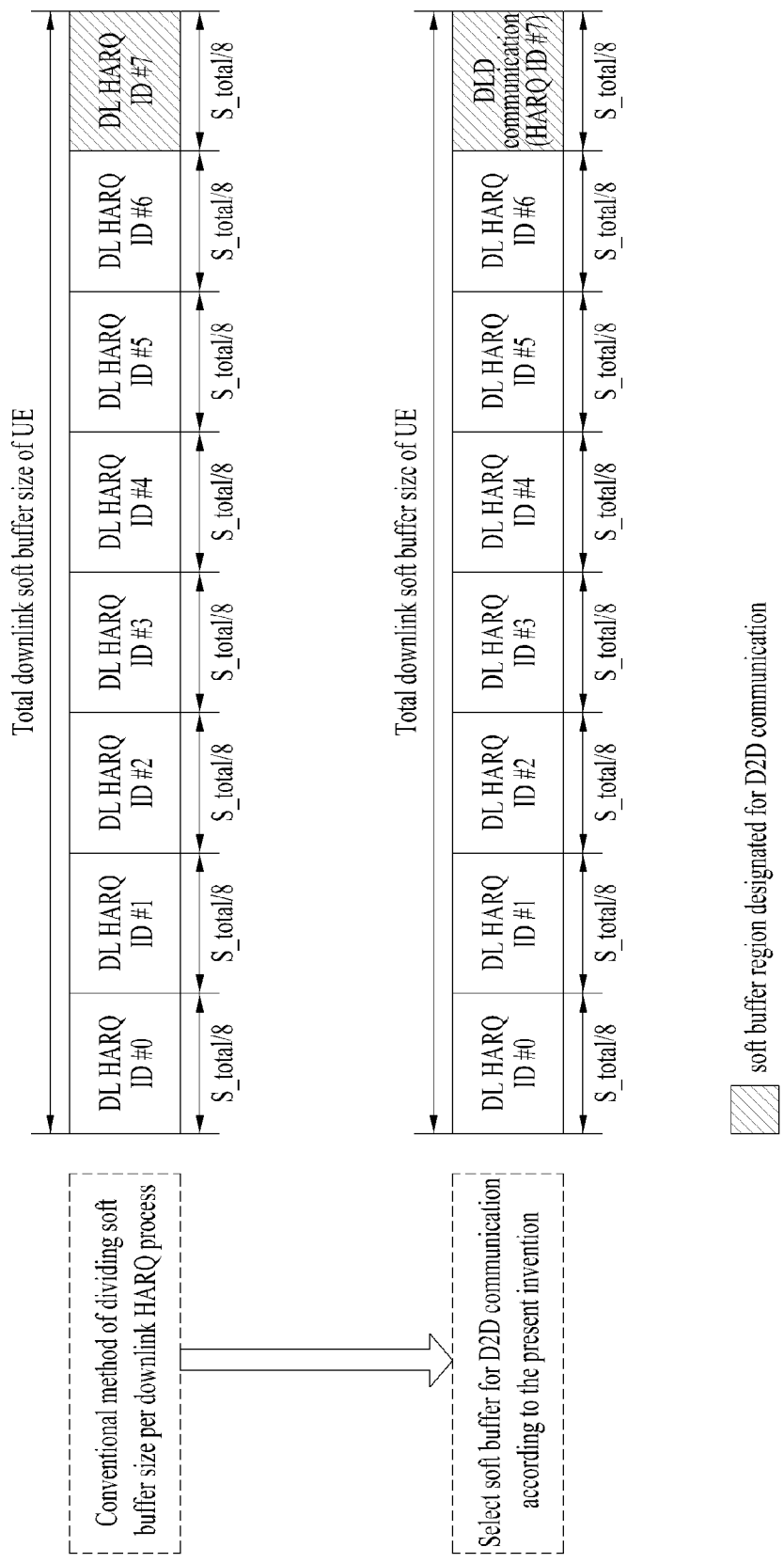
FIG. 13 illustrates a case in which part of a plurality of downlink HARQ processes set for downlink communication in the direction of eNB2D is set for D2D communication according to an embodiment of the present invention.

FIG. 13 illustrates an embodiment of setting part of a plurality of downlink HARQ processes set for eNB2D downlink communication, for D2D communication according to the first embodiment of the present invention.

In FIG. 13, it is assumed that an FDD system is present and one of 8 downlink HARQ processes set for eNB2D downlink communication is designated for D2D communication. In addition, it is assumed that a soft buffer size per downlink HARQ process is determined by dividing "a total downlink soft buffer size (S_total)" by "a maximum number of HARQ processes used for downlink communication".

Referring to FIG. 13, the eNB may transmit, to the UE, information indicating that downlink HARQ process #7 from among 8 downlink HARQ processes set for eNB2D downlink communication is set for D2D communication according to the first embodiment of the present invention.

Upon reception of the information, the UE may transmit ACK/NACK according to whether D2D data has been successfully received and retransmit the D2D data using downlink HARQ process #7 having a soft buffer size of "S_total/8".

Second Embodiment

According to the second embodiment, the eNB may additionally signal, to the UE, information about the number of HARQ processes defined for D2D communication independently of a plurality of downlink HARQ processes set for eNB2D downlink communication, using a predetermined higher layer signal or physical layer signal or through a predefined rule. The information about the number of HARQ processes defined for D2D communication according to the second embodiment of the present invention may be transmitted with information about the number of HARQ processes for eNB2D downlink communication or the two pieces of information may be independently signaled to the UE.

For example, when the UE receives the information according to the second embodiment of the present invention from the eNB, the UE can assume the number of all downlink HARQ processes used for downlink communication as the sum of the number of downlink HARQ processes set for eNB2D downlink communication and the number of HARQ processes additionally defined for D2D communication.

Therefore, according to the second embodiment of the present invention, the UE can determine the soft buffer size per downlink HARQ process by dividing "a total downlink soft buffer size (S_total) of the UE" by "the number of downlink HARQ processes set for eNB2D downlink communication+the number of HARQ processes defined for D2D communication".

Figure 14:
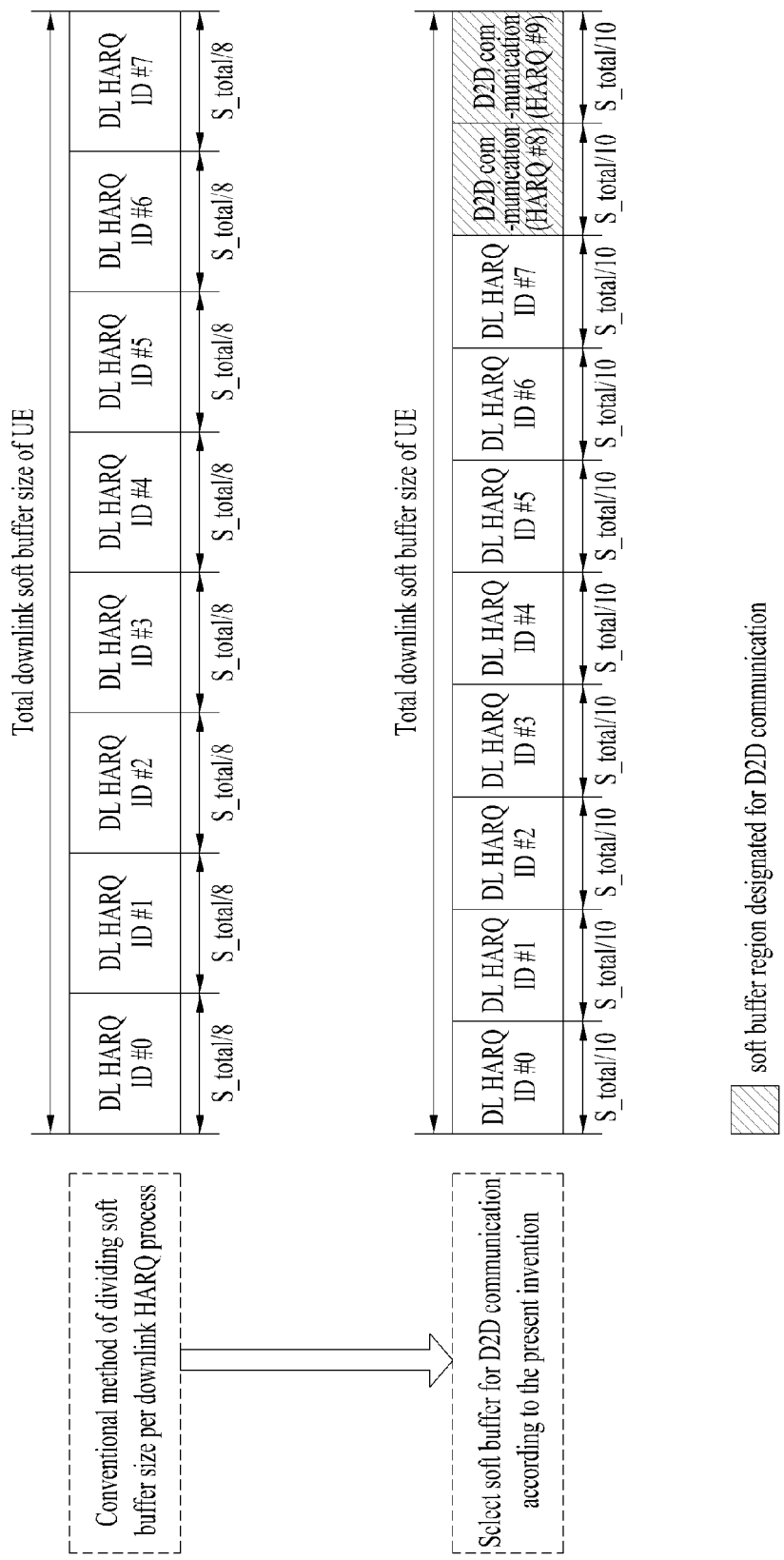
FIGS. 14 and 15 illustrates a case of performing D2D communication or a HARQ operation of D2D communication according to embodiment of the present invention.

FIG. 14 illustrates a case in which D2D communication or a HARQ operation of D2D communication is performed according to the second embodiment of the present invention.

Referring to FIG. 14, the UE may perform D2D communication according to a predefined rule on the assumption that 2 HARQ processes (e.g. D2D communication HARQ processes #8 and #9) are defined for D2D communication.

That is, the UE may consider the number of downlink HARQ processes used for downlink communication as 10 that is the sum of 8 downlink HARQ processes set for eNB2D downlink communication and 2 HARQ processes defined for D2D communication.

Accordingly, the UE calculates a soft buffer size per downlink HARQ process as "S_total/10" according to a predefined rule on the basis of the information received from the eNB.

Therefore, the UE may transmit ACK/NACK according to whether D2D data has been successfully received and retransmit the D2D data using 2 HARQ processes (i.e. D2D communication HARQ processes #8 and #9) each having a soft buffer size of "S_total/10".

Third Embodiment

In the third embodiment of the present invention, at least one of the first embodiment and the second embodiment of the present invention is extended in consideration of the characteristic of D2D communication that a specific UE attempts to transmit large-capacity data to another UE within a relatively short time.

In the third embodiment of the present invention, it is assumed that the eNB can signal, to the UE, information about downlink HARQ processes used for D2D communication, from among eNB2D downlink HARQ processes, according to the first embodiment or information about the number of HARQ processes defined for D2D communication independently of the eNB2D downlink HARQ processes according to the second embodiment.

In this case, the UE may allocate (or set) a soft buffer size occupied by a specific HARQ process used for D2D communication larger than a soft buffer size occupied by an eNB2D downlink HARQ process.

Here, information about the soft buffer size occupied by the specific HARQ process used for D2D communication can be signaled by the eNB to the UE using a predetermined higher layer signal or physical layer signal (explicitly) or through a predefined rule (implicitly).

Alternatively, the UE may determine the soft buffer size occupied by the specific HARQ process used for D2D communication on the basis of a predefined rule. For example, when D2D communication is performed on the basis of existing uplink radio resources, a rule can be preset such that the soft buffer size occupied by the specific HARQ process used for D2D communication is determined according to a result of comparison of the uplink system bandwidth and the downlink system bandwidth of the current system or the ratio of the uplink system bandwidth to the downlink system bandwidth.

Accordingly, when the uplink system bandwidth for D2D communication is wider than the downlink system bandwidth, the soft buffer size occupied by the specific HARQ process used for D2D communication can be set to be larger than the soft buffer size occupied by an eNB2D downlink HARQ process.

Conversely, when the uplink system bandwidth for D2D communication is narrower than the downlink system bandwidth, the soft buffer size occupied by the specific HARQ process used for D2D communication can be set to be smaller than the soft buffer size occupied by an eNB2D downlink HARQ process.

When the uplink system bandwidth for D2D communication equals the downlink system bandwidth, the soft buffer size occupied by the specific HARQ process used for D2D communication can be set to be equal to the soft buffer size occupied by an eNB2D downlink HARQ process.

Furthermore, information about setting for the UE to determine the soft buffer size of the specific HARQ process used for D2D communication may be previously signaled by the eNB to the UE through a higher layer signal or physical layer signal.

In addition, the third embodiment of the present invention can be extended and applied to even a case in which D2D communication is performed through various predefined radio resource regions. Furthermore, the third embodiment of the present invention can be extended and applied to a case in which the soft buffer size occupied by the specific HARQ process used for D2D communication is allocated (or set) smaller than the soft buffer size occupied by an eNB2D downlink HARQ process.

Figure 15:
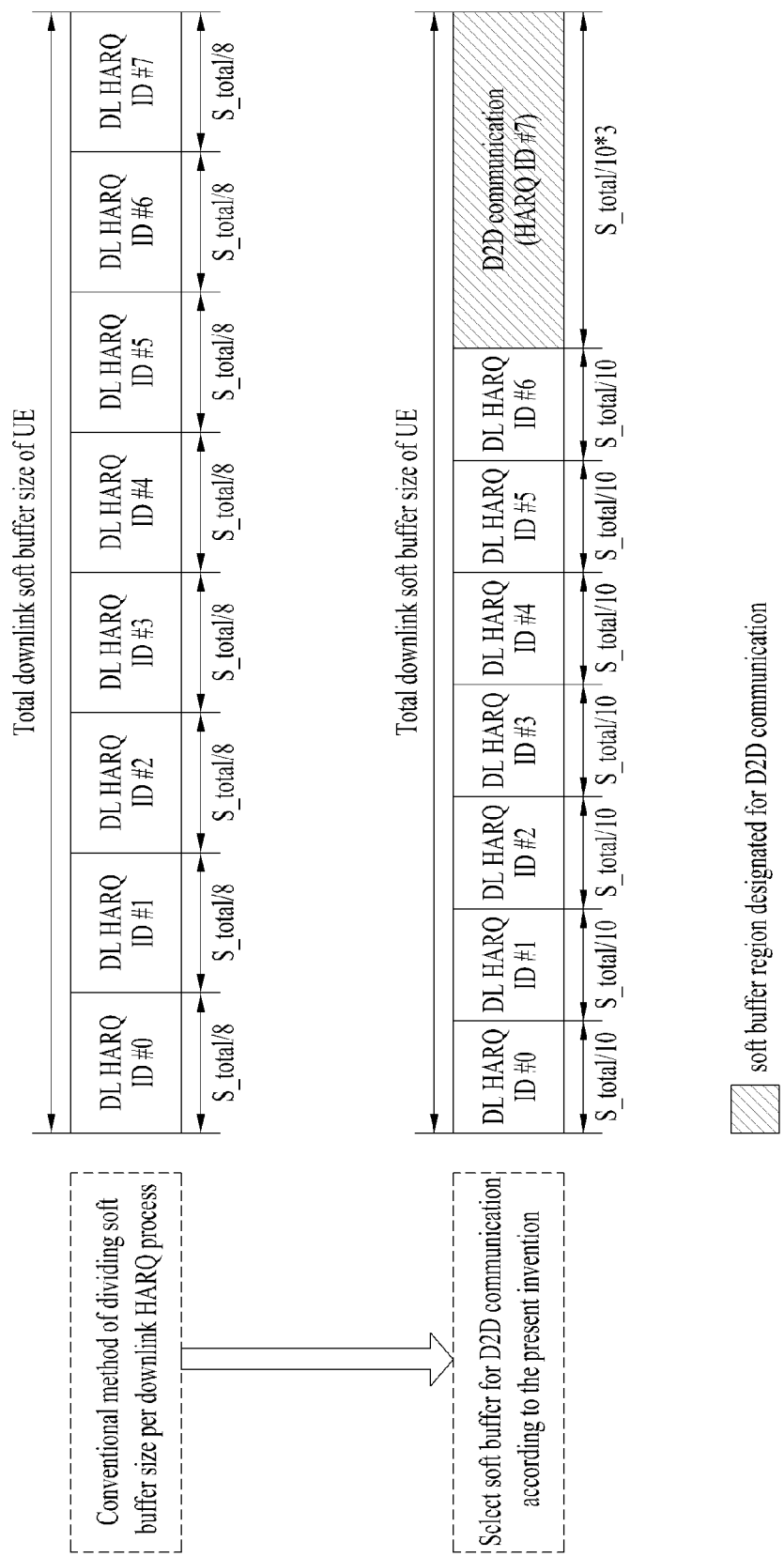

FIG. 15 illustrates a case in which D2D communication or a HARQ operation of D2D communication is performed according to the third embodiment of the present invention in the same environment as that shown in FIG. 13.

The eNB may inform the UE that downlink HARQ process #7 is set for D2D communication explicitly or implicitly.

The UE may set a soft buffer size occupied by the specific HARQ process used for D2D communication to be larger or smaller than a soft buffer size occupied by an eNB2D downlink HARQ process on the basis of the information received from the eNB.

For example, if the eNB sets, for the UE, the soft buffer size occupied by the specific HARQ process to three times the soft buffer size occupied by an eNB2D downlink HARQ process using a predefined higher layer signal or physical layer signal or through a predefined rule, when the soft buffer size occupied by an eNB2D downlink HARQ process is "S_total/10", the soft buffer size occupied by the specific HARQ process can be set to "3*S_total/10".

A description will be given of methods additionally applicable to the first, second and third embodiments of the present invention.

In the present invention, when UEs participating in D2D communication respectively communicate with different eNBs, information about a downlink HARQ process set or designated for D2D communication can be shared between the eNBs through an X2 interface or a predefined radio resource channel. For example, the eNBs can share the ID of the downlink HARQ process set for D2D communication. When this method is used, the eNBs respectively corresponding to the UEs performing D2D communication can efficiently support communication related to D2D operation between the UEs communicating therewith as well as UEs that do not perform D2D communication, in consideration of resources and the downlink HARQ process used for corresponding D2D communication.

In addition, according to the present invention, a UE may set a specific soft buffer region such that a downlink HARQ process used for D2D communication and an eNB2D downlink HARQ process share the specific soft buffer region, on the basis of a predefined priority rule.

For example, the specific soft buffer region can be set such that the specific soft buffer region is preferentially used by the eNB2D downlink HARQ process than the downlink HARQ process used for D2D communication.

In addition, when an eNB2D downlink communication load is not high at a specific time or all downlink soft buffer regions of a UE are not occupied by eNB2D downlink HARQ processes, a specific downlink HARQ process for D2D communication may be performed using a predefined specific soft buffer region. Of course, the specific downlink HARQ process for D2D communication may be performed using a soft buffer region that is not used by an eNB2D downlink HARQ process, instead of the specific soft buffer region.

Conversely, when the eNB2D downlink communication load increases at a specific time following the specific time and thus all downlink soft buffer regions of the UE need to be used by the eNB2D downlink HARQ processes, a specific downlink HARQ process for D2D communication, which is currently performed, may be dropped or forcibly terminated. A specific soft buffer region occupied by the forcibly terminated downlink HARQ process for D2D communication may be reused by the eNB2D downlink HARQ processes.

Furthermore, the UE may set the dropped or forcibly terminated specific downlink HARQ process for D2D communication such that ACK is transmitted to a higher layer of the UE on the assumption that communication has been successfully terminated all the time. Conversely, the UE may set the forcibly terminated specific downlink HARQ process for D2D communication such that NACK is transmitted to the higher layer on the assumption that communication has failed all the time.

While the aforementioned methods have been described on the basis of a case in which an eNB2D downlink HARQ process uses a specific soft buffer region prior to a downlink HARQ process used for D2D communication, the methods can be equally applied to a case in which the downlink HARQ process used for D2D communication uses the specific soft buffer region prior to the eNB2D downlink HARQ process.

In addition, the eNB may readjust a transport block size (TBS) for specific communication in consideration of a decrease in buffer size related to a specific HARQ process in the present invention.

For example, when the whole soft buffer region of a UE is divided by a number of HARQ processes, which is greater than the number of conventional HARQ processes, according to the second or third embodiment of the present invention, the eNB can readjust a transport block size for specific communication in consideration of a reduction in a buffer size related to a specific HARQ process. When a soft buffer size occupied by a HARQ process related to specific type of communication is determined asymmetrically with a soft buffer size occupied by a HARQ process related to a different type of communication in order to simultaneously support various types of communications (e.g. eNB2D communication and D2D communication) having different transmitted/received data characteristics, the eNB may readjust a TBS for specific communication (e.g. eNB2D communication) in consideration of these characteristics (i.e. a decrease in a buffer size related to a specific HARQ process).

To support the operation related to TBS readjustment by the eNB, the UE may be configured to signal information about whether the UE performs communication (e.g. D2D communication) different from previous communication through a predefined channel.

In addition, information or a signal additionally transmitted from the UE to the eNB in order to signal information regarding whether the UE performs specific communication may be a message for requesting readjustment of a TB S for corresponding communication in consideration of a variation in the soft buffer size related to previous communication (or specific communication).

In the present invention, the UE may be configured to perform D2D communication by reusing or applying soft buffer division in an environment in which carrier aggregation (CA) is employed on the assumption that D2D communication is performed on the basis of one virtual component carrier (CC). Furthermore, information related to D2D communication in a CA environment and information about whether D2D communication is applied may be signaled by the eNB to the UE through a predetermined higher layer signal or physical layer signal.

Accordingly, the UE assumes that D2D communication is performed on the basis of a virtual component carrier, independently of eNB2D communication. In this case, the UE may consider that communication is currently performed on the basis of two component carriers (i.e. one for eNB2D communication and one for D2D communication), divide the soft buffer thereof into regions based on the two component carriers and then re-divide each divided soft buffer region by the number of HARQ processes related to each type of communication (or each component carrier). That is, the soft buffer division method according to the present invention can be reused in an environment to which CA is applied. After the soft buffer division process, the UE may use one of the divided soft buffer regions for eNB2D communication and use the remaining divided soft buffer region for D2D communication.

The aforementioned methods provided by the present invention can be extended and applied to not only a case in which D2D communication and eNB2D communication share all or some downlink soft buffer regions but also a case in which a new soft buffer for D2D communication is defined or a case in which an uplink soft buffer similar to that of the eNB is defined for the UE.

In addition, the aforementioned methods provided by the present invention can be extended and applied to a case in which D2D communication and eNB2D communication are performed in an environment to which CA is applied. Furthermore, the aforementioned methods provided by the present invention can be extended and applied to a case in which D2D communication is performed out of coverage of the eNB. For example, when D2D communication is performed out of coverage of the eNB, a rule can be defined such that UEs operate a soft buffer related to D2D communication on the basis of the predefined number of HARQ processes for D2D communication, HARQ process ID for D2D communication or a soft buffer size occupied by a HARQ process related to D2D communication.

That is, the D2D communication related soft buffer is operated on the basis of predefined default configuration information out of coverage of the eNB.

In addition, the embodiments of the present invention may be restrictively applied according to D2D service type (e.g. broadcast D2D, groupcast D2D, unicast D2D and the like).

Furthermore, the embodiments of the present invention may be applied to only a specific D2D communication environment (e.g. out-of-coverage D2D environment, in-coverage D2D environment and partial-coverage D2D environment).

Figure 16:
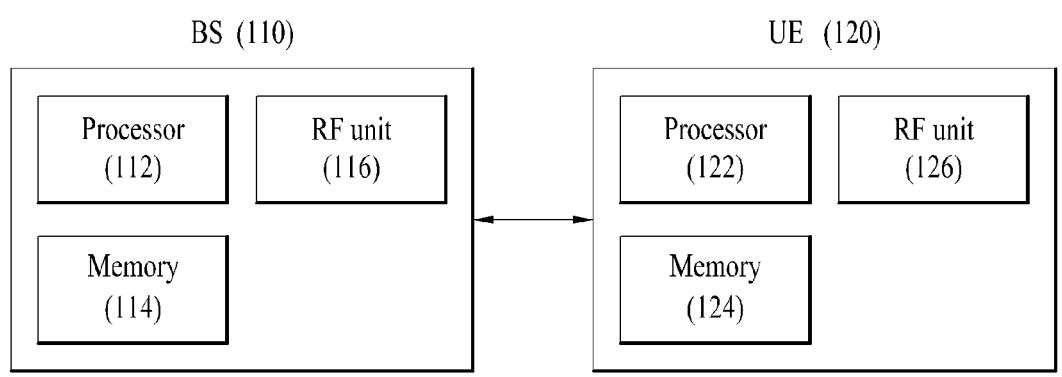
FIG. 16 illustrates a base station and a UE applicable to an embodiment of the present invention.

FIG. 16 illustrates a BS and a UE applicable to an embodiment of the present invention.

When a wireless communication system includes a relay, backhaul link communication is performed between the BS and the relay and access link communication is carried out between the relay and the UE. Accordingly, the BS or UE illustrated in the figure can be replaced by the relay.

Referring to FIG. 16, the wireless communication system includes the BS 110 and the UE 120. The BS 110 may include a processor 112, a memory 114 and a radio frequency (RF) unit 116. The processor 112 may be configured to implement procedures and/or methods proposed by the present invention. The memory 114 may be connected to the processor 112 and store information related to operations of the processor 112. The RF unit 116 may be connected to the processor 112 and transmit and/or receive RF signals. The UE 120 may include a processor 122, a memory 124 and an RF unit 126. The processor 122 may be configured to implement procedures and/or methods proposed by the present invention. The memory 124 may be connected to the processor 122 and store information related to operations of the processor 122. The RF unit 126 may be connected to the processor 122 and transmit and/or receive RF signals. The BS 110 and/or the UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

A specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the terms, fixed station, Node B, eNode B (eNB), access point, etc.

The embodiments of the present invention may be achieved by various means, for example, hardware, firmware, software, or a combination thereof. In a hardware configuration, an embodiment of the present invention may be achieved by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein

INDUSTRIAL APPLICABILITY

While the method for operating a buffer for D2D communication in a wireless communication system and the apparatus for the same are applied to 3GPP LTE in the aforementioned embodiments, the method and apparatus can be applied to various wireless communication systems other than 3GPP LTE.

The invention claimed is:

1. A method for performing a device-to-device (D2D) communication by a user equipment (UE) in a wireless communication system, the method comprising:
    receiving, by the UE from an evolved Node B (eNB), a hybrid automatic repeat and request (HARQ) process configuration for configuring a specific downlink HARQ process among several downlink HARQ processes as a D2D HARQ process; and
    transmitting, by the UE, an uplink acknowledgement/negative acknowledgement (ACK/NACK) for the D2D communication by using a soft buffer for the D2D HARQ process according to the D2D HARQ process,
    wherein the soft buffer for the D2D HARQ process is allocated based on a soft buffer for the specific downlink HARQ process indicated by the HARQ process configuration, and
    wherein a size of the soft buffer for the D2D HARQ process is configured to be larger than a size of a soft buffer for an eNB-to-UE HARQ process.

2. The method according to claim 1, wherein the HARQ process configuration includes an ID of the specific downlink HARQ process.

3. The method according to claim 1, wherein the several downlink HARQ processes comprise at least one eNB-to-UE HARQ process and the D2D HARQ process, and
    wherein the HARQ process configuration includes information of a number of D2D HARQ processes.

4. The method according to claim 3, wherein a size of the soft buffer for the D2D HARQ process is set based on a sum of a number of the at least one eNB-to-UE HARQ process and the number of D2D HARQ processes.

5. The method according to claim 1, wherein the size of the soft buffer for the D2D HARQ process is determined based on a ratio of a system bandwidth for an eNB-to-UE HARQ process to a system bandwidth for the D2D HARQ process.

6. The method according to claim 1, wherein a soft buffer for an eNB-to-UE HARQ process and the soft buffer for the D2D HARQ process are set according to an eNB-to-UE communication load state at a specific time.

7. The method according to claim 1, further comprising transmitting information for transport block size (TBS) readjustment to an eNB, when a size of the soft buffer for an eNB-to-UE HARQ process differs from the size of the soft buffer for the D2D HARQ process.

8. The method according to claim 1, wherein the wireless communication system supports carrier aggregation (CA),
    wherein the HARQ process configuration includes information on a component carrier for at least one eNB-to-UE HARQ process and a component carrier for the D2D HARQ process, and
    wherein the soft buffer for the D2D HARQ process is configured based on the component carrier for the at least one eNB-to-UE HARQ process and the component carrier for the D2D HARQ process.

9. A user equipment (UE) for performing a device-to-device (D2D) communication in a wireless communication system, the UE comprising:
    a radio frequency (RF) unit; and
    a processor,
    wherein the processor is configured to:
    receive, from an evolved Node B (eNB), a hybrid automatic repeat and request (HARQ) process configuration for configuring a specific downlink HARQ process among several downlink HARQ processes as a D2D HARQ process, and
    transmit an uplink acknowledgement/negative acknowledgement (ACK/NACK) for the D2D communication by using a soft buffer for the D2D HARQ process according to the D2D HARQ process, wherein the soft buffer for the D2D HARQ process is allocated based on a soft buffer for the specific downlink HARQ process indicated by the HARQ process configuration, and wherein a size of the soft buffer for the D2D HARQ process is configured to be larger than a size of a soft buffer for an eNB-to-UE HARQ process.

\* \* \* \* \*